United States Patent [19]

Starr

[11] Patent Number: 5,272,659
[45] Date of Patent: Dec. 21, 1993

[54] ENGINE CONTROL WITH FIXED POINT DIGITAL OVERFLOW PREVENTION

[75] Inventor: William G. Starr, South Bend, Ind.
[73] Assignee: Allied-Signal Inc., Morristown, N.J.
[21] Appl. No.: 809,467
[22] Filed: Dec. 18, 1991

Related U.S. Application Data

[63] Continuation-in-part of Ser. No. 543,913, Jun. 26, 1990, abandoned.

[51] Int. Cl.$^5$ .............................................. G06F 7/38
[52] U.S. Cl. ................................ 364/745; 364/431.04
[58] Field of Search ............. 364/745, 724.03, 431.04, 364/431.09

[56] References Cited

U.S. PATENT DOCUMENTS

| | | | |
|---|---|---|---|
| 4,379,338 | 4/1983 | Nishitani et al. | 364/745 |
| 4,592,008 | 5/1986 | Nopper | 364/745 |
| 4,700,324 | 10/1987 | Doi et al. | 364/745 |
| 4,819,198 | 4/1989 | Noll et al. | 364/745 |
| 4,941,119 | 7/1990 | Moline | 364/745 |

OTHER PUBLICATIONS

Drumm, "Saturation Adder Solves Overflow Problems in 2nd-Order Filters" *Electronic Design* vol. 28, No. 18 Sep. 1, 1980 pp. 167–168.

*Primary Examiner*—David H. Malzahn
*Attorney, Agent, or Firm*—Leo H. McCormick, Jr.; Larry J. Palguta; Robert A. Walsh

[57] ABSTRACT

A real time electronic engine control system is disclosed and includes a method of an apparatus for preventing overflow during a fixed point arithmetic operation. Each of two input numbers is divided by the same fixed number to obtain quotients of the input numbers and the arithmetic operation is then performed on the quotients of the input numbers to obtain a resultant number. The resultant number r from the arithmetic operation is compared to maximum (p) and minimum (q) register overflow values and the value of r is selected if $p > r > q$, while the value p is selected if $r \geq p$, and q is selected if $r \leq q$. Finally, the selected one of the compared numbers is multiplied by the fixed number to provide the result of the computation.

10 Claims, 3 Drawing Sheets

ENGINE CONTROL WITH FIXED POINT DIGITAL OVERFLOW PREVENTION

CROSS-REFERENCE TO RELATED APPLICATIONS

This application is a continuation-in-part of my co-pending application Ser. No. 07/543,913, filed Jun. 26, 1990 now abandoned.

SUMMARY OF THE INVENTION

The present invention relates to jet engine controls generally and to the prevention of register overflow in the course of fixed point arithmetic operations affecting such engine control. More particularly, the present invention effects overflow prevention in the real time operation of a digital filter forming a part of a closed loop jet engine control circuit.

In such engine control systems, it is not uncommon to employ a "sample and hold" circuit which supplies signals to control one or more engine parameters such as vane angle or fuel flow. Update information is periodically supplied to this circuit as the engine operating conditions change. The precision of such update information determines the precision with which the engine operating parameter is controlled. For example, if the update information indicates a greater increase in fuel flow than actually needed, fuel efficiency is detrimentally effected. Generally it is desirable for this update information to closely approximate a smooth curve rather than a stair-step type function so that there are fewer "jumps" in the parameter being controlled. The degree to which such a smooth curve is approximated is in part dependent on the accuracy or resolution of the feedback system.

In arithmetic operations, and particularly during the operations of addition or subtraction, it is possible for the size (number of digits) of the result to exceed the size of either of the input values. This typically results from the "carry" operation. Thus, for example, in decimal notation the sum of two single digit numbers seven and eight is the two digit number fifteen. A similar result may occur in computing the difference of two dissimilarly signed numbers. With a pencil and paper, this increase in the number of digits is of no particular concern, however, in dealing with digital computing equipment where the capacity of registers and other components is a specified number of bits, such an increase or "overflow" can be catastrophic.

While it might seem that multiplications would lead to such overflow problems even more frequently, the product of two variables is temporarily considered to be a double precision variable and subsequently the least significant half of the digits, which are not significant in an accuracy sense, are treated as zeros so that such overflows rarely if ever occur.

While most general purpose computers and the common programming languages operate with floating point arithmetic, it is commonplace in many programming languages to have the option of specifying variables as integers with their associated arithmetic being then carried out on a fixed point basis. In such fixed point or integer arithmetic, register overflows may readily occur. The two commonplace techniques for avoiding, or at least lessening, the impact of such overflows are to revert to floating point computation or to repeatedly sense or test for the overflow condition and then saturate (return to the appropriate maximum signed value) the register. Both these techniques suffer from the primary defect of being too time consuming for real time operation as in aircraft and other control applications. Temporarily treating the result of a sum or difference as a double precision number, as is done in products, has met with some acceptance as an overflow solution, but is not feasible where execution time and/or register usage are critical.

Among the several objects of the present invention may be noted an overall improvement in digital engine control systems; the prevention of catastrophic overflows during fixed point arithmetic; the maximum utilization of fixed length registers where word length and register size are the same fixed number; the provision of greater precision in the flow of fuel to a jet engine; the provision of a method of, and apparatus for, the computation of differences and sums without overflows while obtaining final results very close to the theoretical final results; the provision of a real time fixed point digital implementation of a lead/lag filter having internal scaling and limits so that the critical capacity digital components will saturate without overflowing; the prevention of register overflow during an addition or subtraction rather than the detection of the overflow and subsequent compensation thereof; and the implementation of an overflow-proof digital lead/lag filter for real time electronic aircraft engine control applications. These as well as other objects and advantageous features of the present invention will be in part apparent and in part pointed out hereinafter.

In general, a real time electronic engine control system includes one or more lead/lag filters which implement the difference equation:

$$ylag(n) = x(n) - klag*[x(n) - ylag(n-1)]$$

by actually computing the equivalent, but more complicated appearing difference equation:

$$ylag(n) = 2*[\tfrac{1}{2}*ylag(n-1) + (1-klag)*[\tfrac{1}{2}*x(n) - \tfrac{1}{2}*ylag(n-1)]]$$

in fixed point arithmetic so as to preclude overflow during the sum and difference computations. Moreover, the lead/lag filter typically implements the equation:

$$y(n) = ylag(n-1) + klead[x(n) - ylag(n-1)],$$

by computing the more complex appearing, but equivalent equation:

$$y(n) = 2*[klead*[\tfrac{1}{2}*x(n) - \tfrac{1}{2}*ylag(n-1)] + \tfrac{1}{2}*ylag(n-1)]$$

in fixed point arithmetic so as to preclude overflow during the sum and difference computations within the arithmetic unit in which the computation takes place.

Also in general and in one form of the invention, an engine has one or more of its operating parameters monitored and that monitored information is converted to a digital form for processing by a control logic circuit. The control logic input includes the lead/lag filter for improving the signal to noise ratio as well as the overall transfer function of the control logic. The lead/lag filter includes circuitry which prevents overflow during a fixed point arithmetic operation combining a pair of input numbers by first dividing each of the input numbers by the same fixed number to obtain quotients of the input numbers. The fixed number or divisor is typically an integer multiple of the base or radix of the numeral system in which the numbers are expressed and most simply, it is the radix itself so that a simple one digit right shift effects the division. The arithmetic operation (typically addition or subtraction) is then performed on the quotients of the input numbers to obtain a resultant number. A test of the resultant number is made to determine if an overflow would have occurred if the arithmetic operation had been performed on the input numbers, that is, without the division by the fixed number. Based on the test, a selection of the resultant number is made if the test indicates no overflow would have occurred while selection of a fixed overflow indicative number is made if the test indicates an overflow would have occurred. Next, the selected number is multiplied by the original fixed number to provide the result of the computation for further processing, if desired, by the control logic. Finally, the control logic output is converted back to an analog form and an engine parameter is controlled accordingly.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
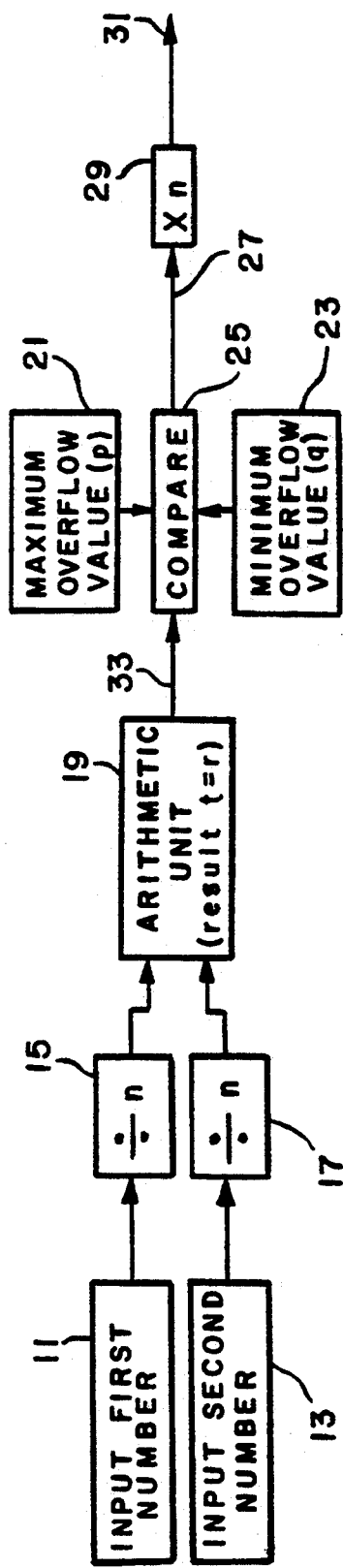
FIG. 1 is a simplified block diagram illustrating the principles of the lead/lag filter portion of the present invention.

FIG. 1 illustrates in a simplistic form of the sequence of events in preventing an overflow during a fixed point arithmetic operation in which a pair of input numbers at 11 and 13 are to be combined in an arithmetic unit 19. Initially, each of the input numbers is divided at 15 and 17 by the same fixed number n to obtain quotients of the two input numbers which quotients of the two input numbers form the two inputs for the arithmetic operation. The fixed number n is typically an integral multiple of the radix or base of the numeral system in which the numbers are expressed so that the dividers 15 and 17 may be efficiently implemented as simple shift operations in registers. In the preferred embodiment, these numbers are both two and the division of each input number comprising a right shift and deletion of the least significant bit of each input number while the multiplication 29 to be discussed subsequently is a corresponding left shift and insertion of a predetermined least significant bit the value of which is independent of the computation. This value is typically zero in the preferred embodiment. The arithmetic operation which is typically addition or subtraction is performed on the quotients of the input numbers to obtain a resultant number r on line 33. The resultant number r is next tested to determine if an overflow would have occurred if the arithmetic operation had been performed on the original input numbers 11 and 13 rather than their respective quotients from the dividers 15 and 17. The preferred embodiment of this testing is by a comparator 25 which compares the resultant number r from the arithmetic operation with a pair of stored numbers p and q, where $p>q$, which numbers are stored at 21 and 23 and are indicative of the quotient of the maximum and minimum numbers representable in the arithmetic operation divided by the same fixed number n as was used in the dividers 15 and 17. As a result of the comparison 25, the output on line 27 is either p, q or r. The r value is selected if the testing indicates no overflow would have occurred, that is, if $p>r>q$. Either p or q is selected if the testing indicates an overflow would have occurred. The value p is selected if $r \geq p$, and q is selected if $r \leq q$. Finally, the selected number (p, q or r) is multiplied by the fixed number n at 29 to provide the result of the computation on line 31.

It should be noted that in the preferred embodiment where the numbers are expressed in base two notation and the value of n is two, the division of each input number by a simple right shift provides a pair of quotients the high order digit positions of which are a copy of the two's complement sign bit (commonly known as sign extension) while the least significant bit has been discarded. This sign bit is zero for positive values and one for negative values. In other words, when dividing by two by a simple right shift, the new high order digit position (sign bit) is a replication of the previous high order digit position. The deletion of the least significant bit of each input number drops the parity (evenness or oddness) of the original numbers while the multiplication 29 (which is then a corresponding left shift and insertion of a predetermined least significant bit) assigns a parity to the result the value of which is independent of the parity of the input numbers.

Figure 2:
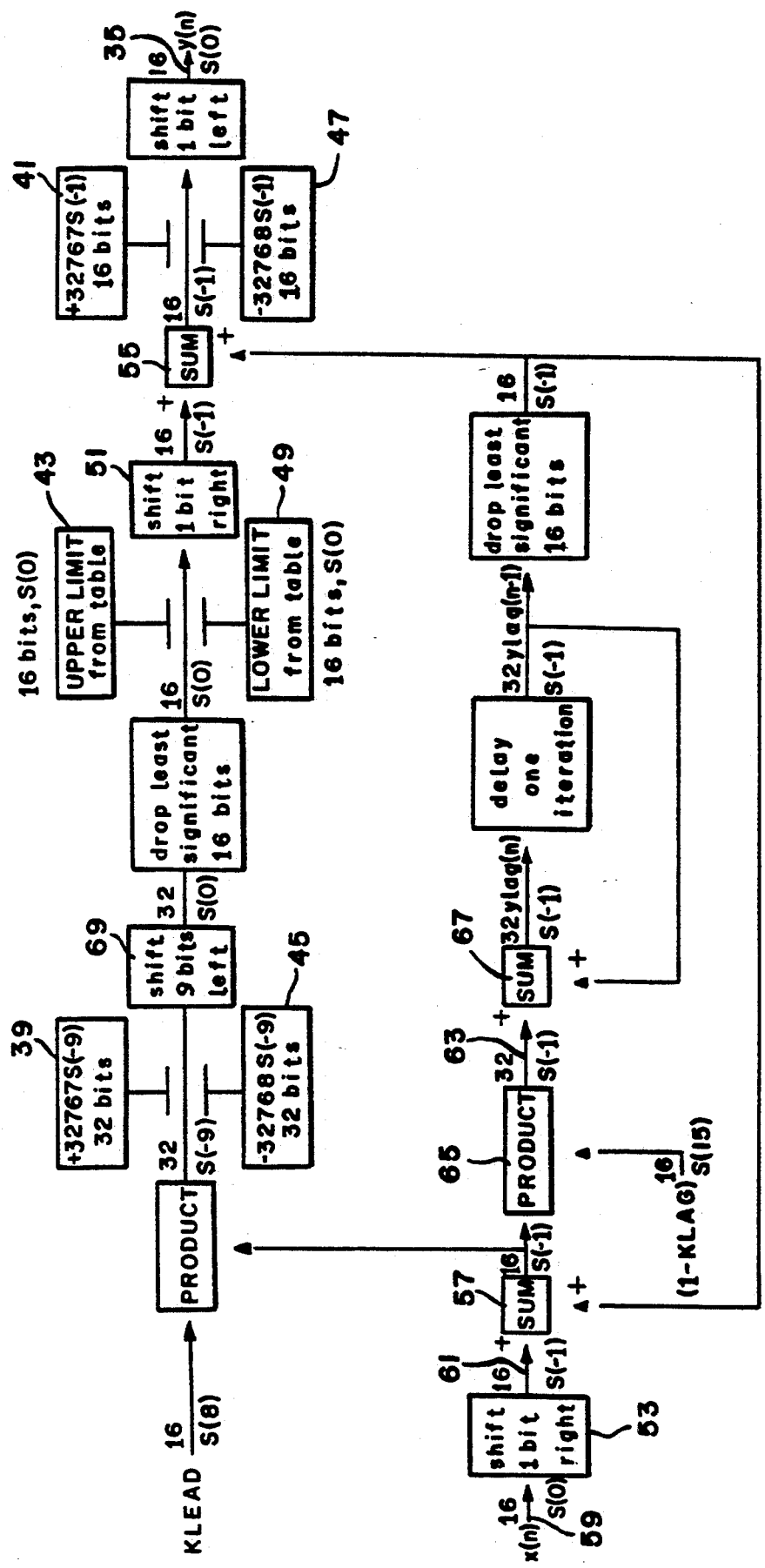
FIG. 2 is a more detailed block diagram illustrating the preferred implementation of the lead/lag filter of FIG. 1.

The principles just discussed in conjunction with FIG. 1 are incorporated into the preferred embodiment of a lead/lag filter for use, for example, in a real time electronic engine control system as shown in FIG. 2. In FIG. 2, the output number on line 35 immediately after a one bit left shift in shift register 37 corresponds to the output 31 after multiplication 29 in FIG. 1. The maximum overflow value p at 21 in FIG. 1 has fixed counterparts 39 and 41 in FIG. 2 and also a stored selectable counterpart 43. Similarly, the minimum overflow value q in FIG. 1 has fixed counterparts 45 and 47 in FIG. 2 and also a stored selectable counterpart 49. The upper and lower limits 43 and 49 are optional more stringent upper and lower bounds on the computation. The divide by n functions 15 and 17 in FIG. 1 are implemented as simple right shift registers 51 and 53 immediately preceding arithmetic units 55 and 57 respectively. Moreover, the inputs to each of the three summers 55, 57 and 67 all have their low order digit suppressed.

The circuit of FIG. 2 is a digital implementation of a difference equation representative of a filter where the output leads the input at certain frequencies and lags the input at other frequencies. The circuit uses all fixed point arithmetic, mostly single precision, for rapid real time operation. FIG. 2 illustrates such a circuit, frequently called a lead/lag filter, for implementing the difference equation:

$$ylag(n) = x(n) - klag*[x(n) - ylag(n-1)]$$

by computing the difference equation:

$$ylag(n) = 2*[\tfrac{1}{2}*ylag(n-1) + (1-klag)*[\tfrac{1}{2}*x(n) - \tfrac{1}{2}*ylag(n-1)]]$$

in fixed point arithmetic so as to preclude overflow during the sum and difference computations.

In such a filter, the output on line 35 is normally equal to the input on line 59 at steady state. The output on line 35 is, however, always even because of the left shift 37. For even inputs on line 59, the output does equal the input, however, for odd inputs on line 59, the output on line 35 is the next lower even integer. The values of the upper and lower limits 43 and 49 are bounds specified by a particular application and are stored in a table to be looked up as needed, as are the constants "klead" and "klag". These latter two constants are, in each specific application, determined from the corresponding lead (t1) and lag (t2) time constants and the sampling interval (repetition rate of the sampling of the input signal x(n) on line 59) (t3) and expressed by the equations:

$$klead = (2*t1 - t3)/(2*t2 + t3); \text{ and}$$

$$klag = (2*t2 - t3)/(2*t2 + t3).$$

The circuit of FIG. 2 additionally implements the equation:

$$y(n) = ylag(n-1) + klead*[x(n) - ylag(n-1)]$$

by computing the equivalent equation:

$$y(n) = 2*[klead*[\tfrac{1}{2}*x(n) - \tfrac{1}{2}*ylag(n-1)] + \tfrac{1}{2}*ylag(n-1)]$$

again in fixed point arithmetic, and again so as to preclude overflow within the computing unit (be it a register, arithmetic unit or other computational or storage component of specified bit capacity) during the sum and difference computations.

Figure 3:
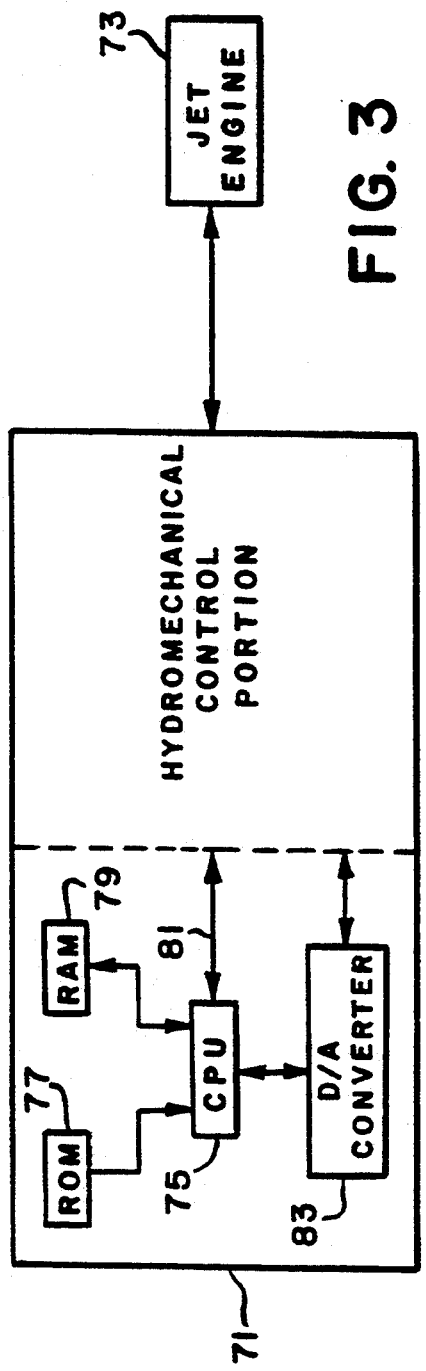
FIG. 3 is a simplified block diagram of an engine control system according to the present invention in one preferred form.

FIG. 3 depicts a generalized engine control system in which the present invention finds particular utility. The control 71 is coupled to a jet engine 73 and includes an electrical portion and a hydromechanical portion. The electrical portion includes a central processing unit 75, read-only memory 77, random access memory 79, and one or more digital/analog converters 83. Discrete input or output signals as on line 81 may also be present. The central processing unit 75 may, for example, be of a type having a set of instructions (including the fixed-point instructions used by the lead/lag filter) defined by MIL-STD-1750A. The register size for such a central processing unit is typically 16 bits. The lead/lag algorithm is embedded in the read-only memory 77 as a subroutine to be called up at the appropriate time. The values for the constants klead, klag, and the upper and lower limits 43 and 49 may be stored in either read-only memory 77 or random access memory 79. The current values of the variables x(n), y(n) and ylag(n) are stored in random access memory 79.

Figure 4:
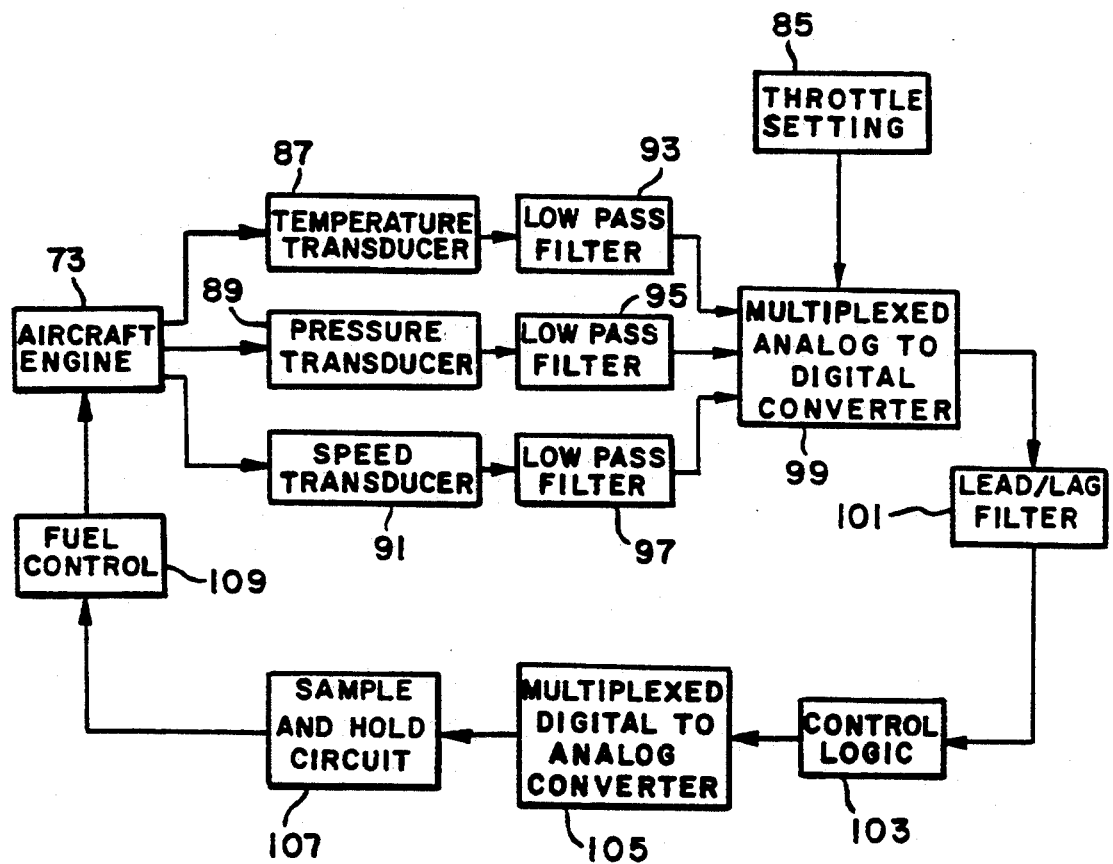
FIG. 4 is a more detailed schematic block diagram of an engine control system according to the present invention.

In FIG. 4, the engine 73 has one or more of its operating parameters monitored and that monitored (analog) information is converted to a digital form for processing by the control logic. The control logic 103 input from the lead/lag filter 102 of FIG. 2 improves the signal to noise ratio and improves the overall transfer function of the control logic. The lead/lag filter and the control logic are, generally speaking, embodied in the portion of block 71 to the left of the dotted line in FIG. 3. The control logic output is converted back to an analog form and an engine parameter is controlled accordingly. Specifically, a series of sensors or transducers for temperature, pressure, and engine speed 87, 89 and 91 respectively have analog outputs supplied to corresponding "alias" eliminating low pass filters 93, 95 and 97. Of course, more than one temperature or pressure may be monitored at different locations within the engine. The outputs of these filters are converted to digital values on a time division multiplex basis by the A/D converter 99. An input indicative of the current engine throttle setting from transducer 85 is also converted to digital form and this information is supplied to the lead/lag filter 101 which functions to cut out much of the noise in the sensor information. The lead/lag filter 101 also allows a greater range of inputs than was heretofor possible without distorting the output to the control logic 103. The results from the control logic circuit 103 are converted back to an analog form in a time division multiplexed fashion at 103 and supplied to one or more sample and hold circuits such as 107. The fuel control transducer 109 is controlled accordingly. As noted earlier, the more smooth the periodic updating of the sample and hold circuit 107, the more closely the actual engine performance will follow the desired response.

Returning to FIG. 2, the numerical value of k in the "S(k)" notation indicates the number of positions the binary point must be moved toward the left from the right of the rightmost digital position to actually express the numerical value at that location in the circuit. Thus, for example, the S(0) on input line 59 indicates that the value on that signal path is actually an integer while the S(−1) on line 61 indicates that the i.e., the binary point needs to be moved to the left (−1) positions which is one position to the right in order to actually express the value in conventional form. The numerical value of either 16 or 32 directly above the several signal paths is an indication of the precision (in bits) of the signal at that point, i.e., it indicates either single or double precision for a computing system having 16-bit words. Thus, for example, the output on line 63 from the multiplier 65 is a double precision number the binary point of which must be shifted one place to the right to get a conventional representation of the product. Note that both inputs to summers 57, 67 and 55 are S(−1) numbers, i.e., they have been effectively divided by two prior to the arithmetic addition (subtraction in the case of 57) so as to avoid the overflow as discussed previously.

The klead limiting by upper and lower bounds 39 and 45 is effected before rescaling and in double precision to maintain maximum precision after rescaling 69. These limiting values are precomputed in double precision with appropriate scaling to reduce computation time. The overflow indicative values in registers 41 and 47 are similarly precomputed in single precision with proper scaling for the same reason.

In summary, a computational register overflow in a real time engine control system is prevented by predetermining maximum and minimum register overflow values which values are stored as a pair of numbers p and q, where p>q. These values are indicative of the quotient of the maximum and minimum numbers representable in the arithmetic operation divided by said fixed number. The computation is performed and the actual computation result is selected if that result lies within the range of the arithmetic unit, while one of the overflow values is selected if an overflow would have occurred had there been no initial division by the fixed number. The parity of the result of the computation is independent of the parity of the input numbers. In one preferred form, the base of the numeral system in which the numbers are expressed and the fixed number are both two and the division of each input number comprises a right shift to effect deletion of the least significant digit of each input number, while the multiplication comprises a left shift and insertion of a predetermined least significant digit the value of which is independent of the computation.

From the foregoing, it is now apparent that a novel engine control technique which avoids overflow problems in fixed point computations within the control circuit has been disclosed meeting the objects and advantageous features set out hereinbefore, as well as others, and that numerous modifications as to the precise shapes, configurations and details may be made by those having ordinary skill in the art without departing from the spirit of the invention or the scope thereof as set out by the claims which follow.

I claim:

1. A real time electronic engine control circuit comprising:
   means for determining current engine operating data and providing digital representations thereof;
   means for preventing overflow in a digital component during fixed point arithmetic operations on a pair of input numbers derived from the digital representations comprising:
   means for dividing each of the input numbers by the same fixed number to obtain quotients of the input numbers, the base of the numeral system in which the numbers are expressed and the fixed number both being two, and the means for dividing each input number comprising at least one shift register for effecting a right shift and deletion of the least significant digit of each input number,
   means utilizing the digital component in performing a fixed point arithmetic operation on the quotients of the input numbers to obtain a resultant number r,
   means for providing a pair of numbers p and q, where p>q, which numbers are maximum and minimum overflow indicative values divided by said fixed number,
   means for comparing the resultant number r from the arithmetic operation with the pair of numbers p and q and selecting r if p>r>q, selecting p if r≧p, and selecting q if r≦q, and
   means for multiplying the selected one of the compared numbers by the fixed number to provide the result of the computation, the means for multiplying comprising a shift register for effecting a left shift and insertion of a predetermined least significant digit, the value of which is independent of the computation; and
   means for utilizing the result of the computation to control the engine.

2. The real time electronic engine control circuit of claim 1 wherein the parity of the result is independent of the parity of the input numbers.

3. The real time electronic engine control circuit of claim 1 wherein the arithmetic operation is one of addition and subtraction and wherein the means for dividing provides quotients of the input numbers which have a predetermined number of the higher order digit positions which are replications of the respective predetermined number of highest order digit positions of the input numbers.

4. A real time electronic engine control system for an engine comprising:
   analog means for monitoring at least one engine operating parameter; means for converting the analog information on the monitored parameter to a digital form x(n); a lead/lag filter implementing the difference equation:

$$ylag(n) = x(n) = klag*\{x(n) - ylag(n-1)\}$$

by computing the difference equation:

$$ylag(n) = 2*\{\tfrac{1}{2}*ylag(n-1) + (1-klag)*[\tfrac{1}{2}*x(n) - \tfrac{1}{2}*ylag(n-1)]\}$$

in fixed point arithmetic so as to preclude overflow during the sum and difference computations; control logic means coupled to the lead/lag filter for determining, and providing as an output, operational values for the engine; means for converting the control logic output to an analog form; and means for controlling the flow of fuel to the engine in accordance therewith.

5. The engine control system of claim 4 wherein the lead/lag filter additionally implements the equation:

$$y(n) = ylag(n-1) + klead*[x(n) - ylag(n-1)],$$

the filter further including means for computing:

$$y(n) = 2*[klead*[\tfrac{1}{2}*x(n) - \tfrac{1}{2}*ylag(n-1)] + \tfrac{1}{2}*ylag(n-1)]$$

in fixed point arithmetic so as to preclude overflow within the means for computing during the sum and difference computations.

6. A real time electronic engine control circuit comprising:
   means for determining current engine operating data and providing digital representations thereof;
   a register;
   means for preventing register overflow during a fixed point arithmetic operation combining a pair of input numbers derived from the digital representations comprising;
   means for dividing each of the input numbers by the same fixed number to obtain quotients of the input numbers, the fixed number being an integer multiple of the base of the numeral system in which the numbers are expressed,
   means for performing the arithmetic operation on the quotients of the input numbers to obtain a resultant number and for storing the resultant number in the register,
   means for testing the resultant number to determine if an overflow would have occurred if the arithmetic operation had been performed on the input numbers,
   means selecting the resultant number if the testing indicates no overflow would have occurred and a fixed overflow indicative number if the testing indicates an overflow would have occurred, and means for multiplying the selected number by the fixed number to provide the result of the computation; and means for utilizing the result of the computation to control the engine.

7. The real time electronic engine control circuit of claim 6 wherein the parity of the result is independent of the parity of the input numbers, and the base of the numeral system in which the numbers are expressed and the fixed number are both two.

8. The real time electronic engine control circuit of claim 6 further comprising first and second pairs of shift registers, and wherein the means for dividing each input number comprises a right shift in a corresponding one of said first shift registers and deletion of the least significant bit of each input and the means for multiplying comprising a left shift in a corresponding one of said second shift registers and insertion of a predetermined least significant bit, the value of which is independent of the computation.

9. The real time electronic engine control circuit of claim 6 wherein the arithmetic operation is one of addition and subtraction and wherein the means for dividing provides quotients of the input numbers which have a predetermined number of the higher order digit positions which are replications of the respective predetermined number of highest order digit positions of the input numbers.

10. In fixed point digital engine control equipment, apparatus for preventing overflow in a component of the equipment during a fixed point arithmetic operation combining a pair of input numbers to obtain a computational result, and apparatus for utilizing the results of the operation for engine control purposes, the apparatus for preventing overflow comprising:

at least one shift register for dividing each of the input numbers by the same fixed number to obtain quotients of the input numbers;

arithmetic means including at least one digital component in which overflow is to be prevented, for performing the arithmetic operation on the quotients of the input numbers to obtain and store a resultant number;

means for providing a pair of numbers p and q, where $p > q$, which numbers are indicative of the quotient of the maximum and minimum numbers representable in the arithmetic operation divided by said fixed number;

means for comparing the resultant number r from the arithmetic operation with the pair of indicative numbers p and q and selecting r if $p > r > q$, selecting p if $r \geq p$, and selecting q if $r \leq q$; and a shift register for multiplying the selected one of the compared numbers by the fixed number to provide the computational result, and the apparatus for utilizing the results of the operation for engine control purposes comprising: a sample and hold circuit and means for controlling the flow of fuel to the engine.

* * * * *